US008534717B2

(12) United States Patent
Whetten et al.

(10) Patent No.: US 8,534,717 B2
(45) Date of Patent: Sep. 17, 2013

(54) INTERCONNECT ASSEMBLY

(75) Inventors: Curits L. Whetten, Suwanee, GA (US); Charles W. Friedli, Lawrenceville, GA (US); Kevin K. Maggert, Lawrenceville, GA (US)

(73) Assignee: Motorola Solutions, Inc., Schaumburg, IL (US)

( * ) Notice: Subject to any disclaimer, the term of this patent is extended or adjusted under 35 U.S.C. 154(b) by 957 days.

(21) Appl. No.: 12/433,570

(22) Filed: Apr. 30, 2009

(65) Prior Publication Data
US 2010/0276946 A1 Nov. 4, 2010

(51) Int. Cl.
*E05C 19/06* (2006.01)
*E05C 19/00* (2006.01)

(52) U.S. Cl.
USPC ............ 292/80; 292/1; 292/81; 292/DIG. 11; 292/DIG. 61; 292/DIG. 63

(58) Field of Classification Search
USPC ............ 292/340, 341.18, 341.19, 80, 81, 292/87, 303, 1, 8, 137, 138, 145, DIG. 11, 292/DIG. 61, DIG. 63, DIG. 51
See application file for complete search history.

(56) References Cited

U.S. PATENT DOCUMENTS

| 389,605   | A | * | 9/1888 | Shaw        | 292/17  |
|-----------|---|---|--------|-------------|---------|
| 1,913,142 | A | * | 6/1933 | Ondricek    | 24/3.5  |
| 2,193,008 | A | * | 3/1940 | Puerner     | 200/284 |
| 2,580,495 | A | * | 1/1952 | Woods       | 24/654  |
| 2,584,460 | A | * | 2/1952 | Jacobs, Jr. | 200/407 |
| 2,788,419 | A | * | 4/1957 | Young       | 200/243 |
| 3,192,624 | A | * | 7/1965 | Gringer     | 30/162  |
| 3,313,564 | A | * | 4/1967 | Pultz       | 292/87  |
| 3,390,761 | A | * | 7/1968 | Jeanfavre   | 206/338 |
| 3,450,317 | A | * | 6/1969 | Ramer       | 224/242 |
| 3,596,953 | A | * | 8/1971 | Gastaldi    | 292/87  |

(Continued)

FOREIGN PATENT DOCUMENTS

| DE | 19933015 A1    | 5/2000 |
|----|----------------|--------|
| DE | 102004043827 A1 | 3/2006 |

OTHER PUBLICATIONS

International Search Report and Written Opinion for International Application No. PCT/US2010/032062 mailed on Aug. 5, 2010.

(Continued)

*Primary Examiner* — Carlos Lugo
(74) *Attorney, Agent, or Firm* — Barbara R. Doutre

(57) ABSTRACT

An interconnect assembly (100) includes a spring member (200) integrally formed of a first portion (202) having two prongs (208) and a slot (210), the first portion being coupled to a second deflected portion (204) formed of a cantilevered beam (212) with interference fit tabs (214) extending from either side. A latch (400) includes hooks (406) and foot members (408). A housing (600), such as a battery pack housing, includes a side surface (606) having protrusion (602) and pockets (604) formed therein along with vertical side channels (610). The spring, latch and housing (200, 400, 600) are coupled such that the vertical channels (610) capture and guide the interference fit tabs (214) down the side of the housing (600) as the foot members (408) of the latch (400) are inserted into the pockets (604) of the housing (600). As the spring member (200) is pushed downward, the protrusion (602) of the housing (600) captures the slot (210), and the hooks (406) of the latch (400) capture the interference fit tabs (214) of the spring member thereby providing a locked latch-spring assembly (1000).

22 Claims, 9 Drawing Sheets

(56) References Cited

U.S. PATENT DOCUMENTS

| | | | |
|---|---|---|---|
| 3,989,914 A * | 11/1976 | Stearley et al. | 200/453 |
| 4,118,610 A * | 10/1978 | Purssell et al. | 200/407 |
| 4,145,587 A * | 3/1979 | Purssell | 200/407 |
| 4,278,855 A * | 7/1981 | Rossi | 200/407 |
| 4,316,066 A * | 2/1982 | Muller et al. | 200/462 |
| 4,410,776 A * | 10/1983 | Stoll | 200/83 P |
| 5,213,314 A * | 5/1993 | Kano et al. | 267/163 |
| 5,244,755 A | 9/1993 | Benoist et al. | |
| 5,248,072 A * | 9/1993 | Jones | 224/247 |
| 5,265,411 A * | 11/1993 | Belsom | 60/796 |
| 5,314,763 A | 5/1994 | Aksoy et al. | |
| 5,460,906 A * | 10/1995 | Leon et al. | 429/97 |
| 5,535,437 A | 7/1996 | Karl et al. | |
| 5,607,792 A | 3/1997 | Garcia et al. | |
| 5,620,242 A | 4/1997 | Leon et al. | |
| 5,676,354 A * | 10/1997 | Okutsu et al. | 267/158 |
| 5,848,719 A | 12/1998 | Goldenberg | |
| 5,851,692 A | 12/1998 | Potts | |
| 5,869,204 A | 2/1999 | Kottke et al. | |
| 5,895,729 A | 4/1999 | Phelps, III et al. | |
| 6,136,467 A | 10/2000 | Phelps, III et al. | |
| 6,168,881 B1 * | 1/2001 | Fischer et al. | 429/97 |
| 6,200,167 B1 * | 3/2001 | Aso | 439/660 |
| 6,269,993 B1 * | 8/2001 | Ebejer et al. | 224/674 |
| 6,507,266 B1 * | 1/2003 | Bizard et al. | 337/349 |
| 6,529,371 B1 * | 3/2003 | Laio | 361/679.6 |
| 6,550,832 B2 * | 4/2003 | McHenry et al. | 292/336.3 |
| 6,623,049 B2 * | 9/2003 | Shreeve et al. | 292/19 |
| 6,814,325 B2 * | 11/2004 | Kamoda | 242/332.7 |
| 6,921,227 B1 * | 7/2005 | De Jong et al. | 403/329 |
| 7,138,594 B2 * | 11/2006 | Hu et al. | 200/520 |
| 7,331,619 B2 | 2/2008 | Lewis | |
| 7,355,138 B2 * | 4/2008 | Chou | 200/341 |
| 7,682,726 B2 | 3/2010 | Rejman et al. | |
| 7,686,353 B2 * | 3/2010 | Lewis et al. | 292/19 |
| 7,736,797 B2 * | 6/2010 | Kim et al. | 429/161 |
| 7,940,025 B2 * | 5/2011 | Duesselberg | 320/112 |
| 2008/0207026 A1 | 8/2008 | Meyer et al. | |

OTHER PUBLICATIONS

International Preliminary Report on Patentability for International Application No. PCT/US2010/032062 mailed on Nov. 1, 2011.

* cited by examiner

INTERCONNECT ASSEMBLY

FIELD OF THE DISCLOSURE

The present disclosure relates generally to latch-spring assemblies and more particularly to latch-spring assemblies for coupling battery and communication device sub-assemblies.

BACKGROUND

Portable communication devices, such as two-way radios, cell phones and the like, are typically powered from battery packs. The interconnection between the battery pack and portable communication device is a critical design parameter, particularly for products intended for use in the public safety environment where reliable contact must to be maintained under a variety of conditions including variations in temperature and when dropped. A misassembled interconnection between the battery pack and portable communication device may create loading issues resulting in disengagement or intermittent contact between the battery and device. Thus, it is particularly important that battery contact be maintained with a reliable interconnect mechanism. Additionally, a simplified interconnection is desirable in terms of manufacturing the mechanism, ease of assembly, and cost.

Accordingly, it would be beneficial to have an improved interconnect mechanism, particular an interconnect mechanism that can be used to overcome the issues associated with coupling a battery to a portable communication device.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
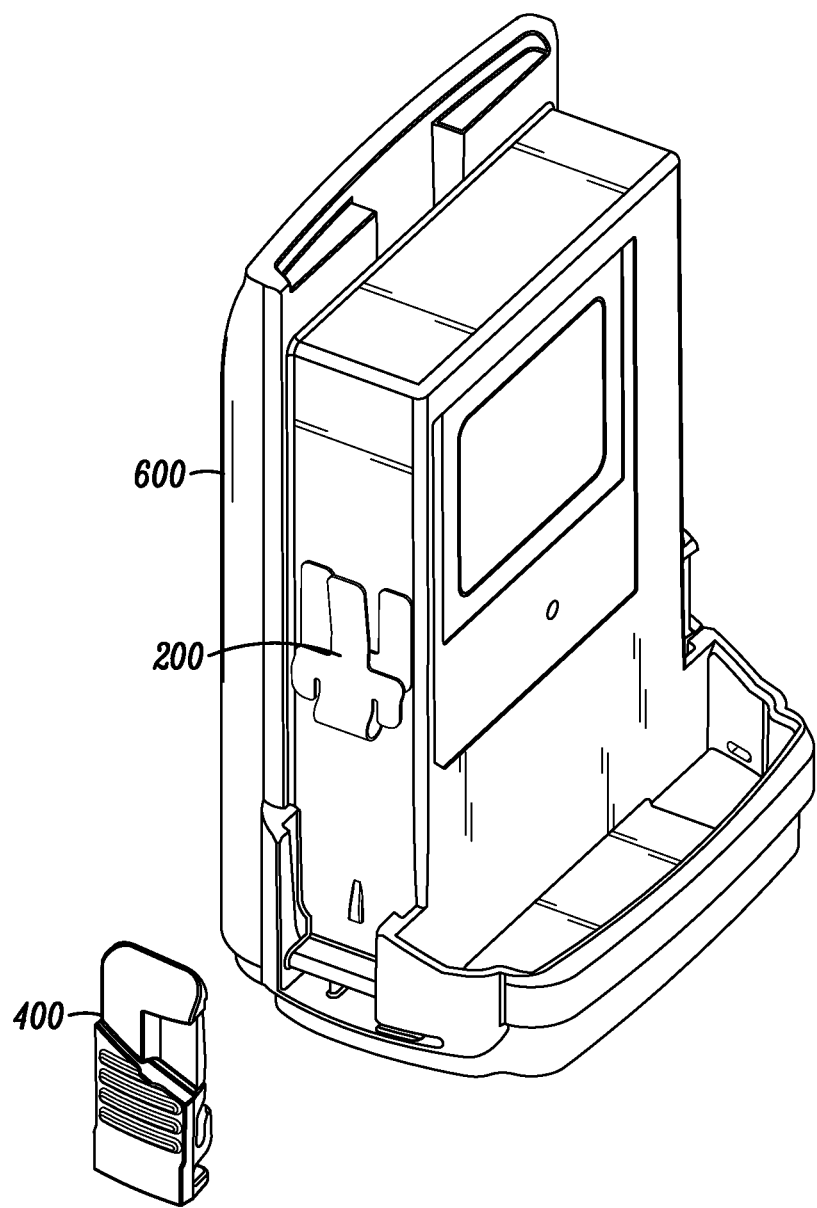
FIG. 1 illustrates a partially exploded view of an interconnect assembly in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In accordance with various embodiments to be described herein, there is provided an improved interconnect assembly. The interconnect assembly includes a spring member and a latch which operably couple to a predetermined form factor of a housing. Each component will be described in terms of its form, function and integration within the overall interconnect assembly. The interconnect assembly is easy to assemble and provides a reliable interface with minimal cost and only three main components. The interconnect assembly provides a spring-latch that can be used to couple one sub-assembly to another, for example a battery pack housing to a portable communication device housing.

Figure 10:
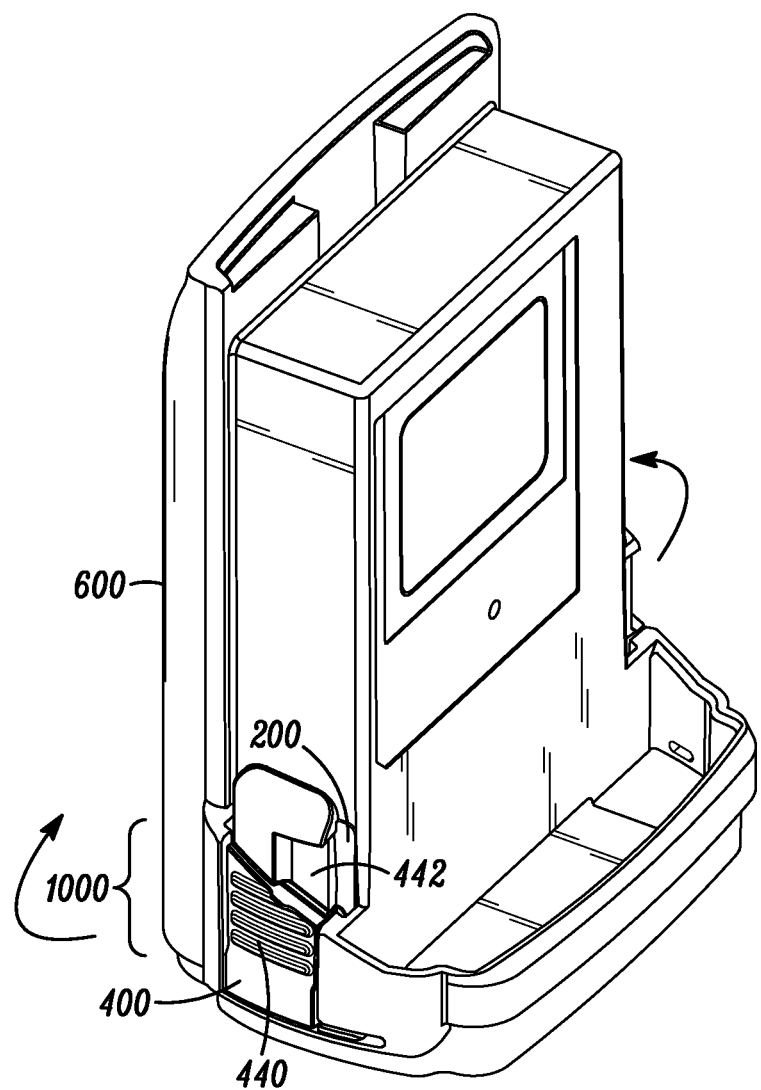
FIG. 10 illustrates a completed latch-spring assembly in a locked position in accordance with an embodiment.

FIG. 1 illustrates a partially exploded view of an interconnect assembly in accordance with an embodiment of the invention. The main elements of the assembly comprise a spring member 200, a latch 400 and a housing 600, each having a predetermined form factor. Each element and its interconnection within the assembly will be described throughout the accompanying views. Referring briefly to FIG. 10, there is shown a completed assembly view of the interconnect assembly 100 in which the spring member 200, latch 400 and housing 600 are operably coupled together to form a latch-spring 1000 which can be used to interconnect the housing 600 to another assembly. For the purposes of description, housing 600 is shown as a battery pack housing which will use the latch-spring 1000 to couple to another assembly, such as a portable communication device (not shown). The interconnect assembly 100 can also be applied to other products (other than battery/radio) having assemblies or sub-assemblies needing interconnection. More than one interconnect assembly can be used, depending on the size and weight of the sub-assemblies requiring interconnection. For the purposes of this example, two assemblies are used on either side of housing 600—although only one is shown.

Figure 2:
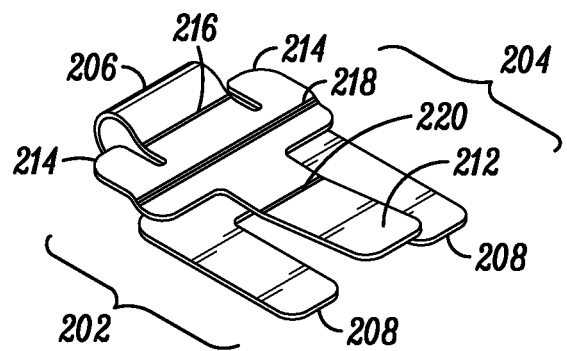
FIG. 2 illustrates a spring member in accordance with an embodiment.
Figure 3:
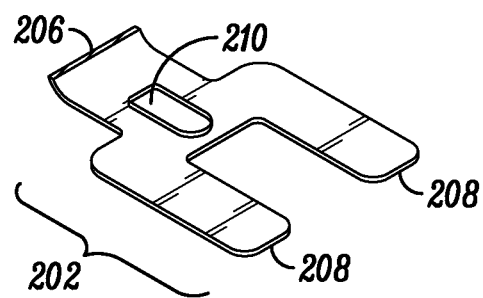
FIG. 3 illustrates a cut-away view of the spring member of FIG. 2 in accordance with an embodiment.

FIG. 2 illustrates spring member 200 in accordance with an embodiment. Spring member 200 is an integrally formed piece part having a first, substantially planar, portion 202 and a second, deflected, portion 204 connected via an elbow 206. Spring member 200 may be formed of a variety of materials, including but not limited to sheet metal or plastic. FIG. 3 shows a breakaway view of the substantially planar portion 202 of spring member 200. The substantially planar portion 202 is formed of a forked portion comprising two prongs 208 and a slot 210. The slot 210 is formed between a base section of the two prongs 208 and elbow 206. Referring to FIGS. 2 and 3, the deflected portion 204 includes a cantilevered beam 212 with interference fit tabs 214 extending therefrom in the opposite direction. Deflected portion 204 extends from the elbow 206 into cantilevered beam 212 over three level changes or bends 216, 218 and 220 formed in the sheet metal.

Figure 4:
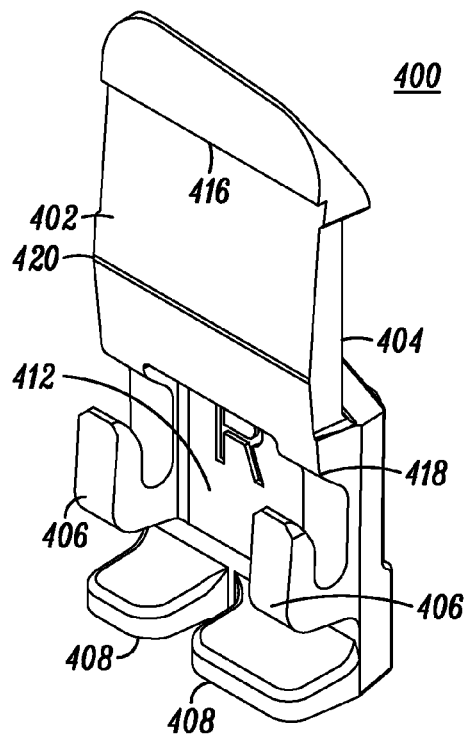
FIG. 4 illustrates a latch formed in accordance with an embodiment.
Figure 5:
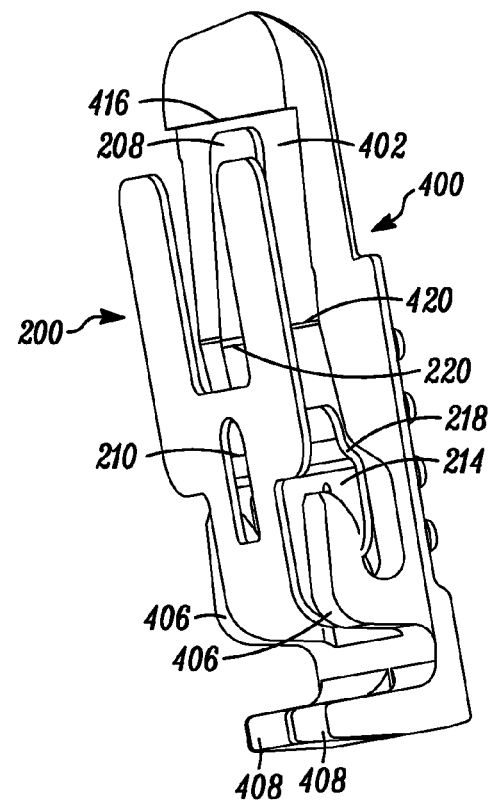
FIG. 5 illustrates the latch and spring member in accordance with an embodiment.

FIG. 4 illustrates latch 400 in accordance with an embodiment of the invention while FIG. 5 illustrates the spring member 200 coupled to the latch 400. The view of FIG. 5 is shown to illustrate how the spring member 200 and latch interconnect when coupled to the housing 600 (shown later). Referring to FIGS. 4 and 5, latch 400 is an integrally formed piece part, such as molded or machined polymer material or metal material, or other suitably rigid structural material. The latch comprises an interior wall 402 and exterior wall 404. The interior wall 402 of latch 400 includes two hooks 406 and two foot members 408. Alternatively, for single latch or symmetrical latch applications a single foot member could be used if desired.

The interior wall 402 of latch 400 is contoured with level changes 416, 418, and 420 which, in conjunction with the hooks 406, receive, align and co-locate with spring member 200. Level change 418 of latch 400 permits the interference fit tabs 214 of spring member 200 to engage within hooks 406 at bend 218. Level change 420 of latch 400 co-locates with bend 220 of spring member 200. Level change 416 of latch 400 provides a step feature which minimizes vertical motion of spring member 200. When spring member 200 is seated within latch 400, the hooks 406 engage the interference fit tabs 214 of the spring member. When coupled to the housing 600, the hooks 406, interference fit tabs 214 and cantilevered beam 212 provide compression and pivoting motion ability for overall assembly.

Figure 6:
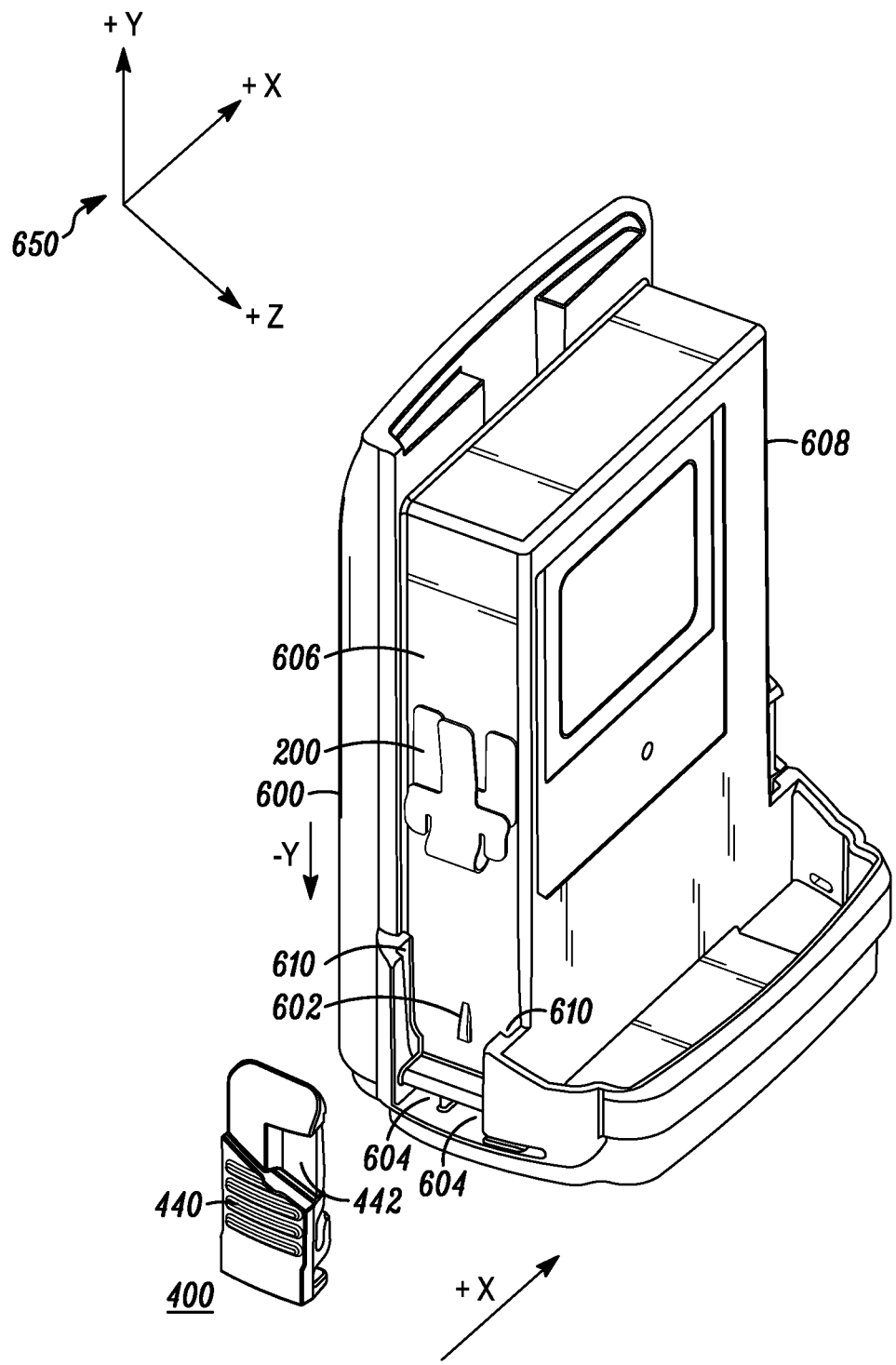
FIG. 6 illustrates the housing, spring member and latch in accordance with an embodiment.

FIGS. 6, 7 8 and 9 illustrate partial views of the engagement of the spring member and latch to the housing 600 in accordance with an embodiment of the invention. FIG. 6 shows housing 600 having a protrusion 602, pockets 604 and vertical channels 610 formed on side surface 606. Housing 600 is preferably formed of a molded polymer material similar material to that of latch 400. For the purposes of description, right and left side surfaces 606, 608 will be described but only the right side surface 606 will be shown in detail. A similar protrusion (not shown) is found on a left side surface 608. An orientation of x, y, and z axes 650 is used to describe the relative motion in the assembly process for the latch-spring assembly 1000. Spring member 200 is slid along right side surface 606 in a downward (−y) direction towards protrusion 602 as latch 400 is moved towards the right side surface 606 in a horizontal (+x) motion directing the insertion of foot members 408 into pockets 604 of housing 600.

FIG. 6 also shows exterior wall 404 of latch 400 including rib features 440 and indentation area 442, however these features are not necessary for coupling the latch to the housing 600. Rather the indentation area 442 is used once the completed latch-spring assembly 1000 is locked and ready to receive a device, for example a battery back housing the completed assembly to engage a communication device. The rib features 440 facilitate finger grip on the latch 400 when in use.

The first and second pockets 604 can be the same size or two different sizes. When a two latch application is used where orientation might be a parameter of interest, then first and second pockets 604 on the right side of the housing 600 are formed of different sizes and are the mirror image of third and fourth pockets formed on the left side surface 608. The foot members 408 of latch 400 are formed to align with their respective pockets when different sizes and mirror imaging is used. For the two latch embodiment, second surface 608 receives a second spring member and latch (not shown) using downward (−y) direction of the spring member and opposing horizontal (−x) motion for positioning the latch. For embodiments in which only a single spring-latch is needed or embodiments where orientation is not of concern, then the pockets and foot members may be of a symmetrical form factor. While the vertical channels 610 are shown at different heights for left/right orientation purposes, the vertical channels 610 could also be of the same height for single latch or symmetric multiple-latch applications.

Across x-y and z orientation, the first and second pockets 604 constrain movement of the (right) latch 400 in y and z directions, and the protrusion 602 constrains movement of the spring member 200 in upward and downward (+/−y) directions.

On the left side surface 608 third and fourth pockets (not shown) constrain movement of the left battery latch in y and z directions, and the second protrusion constrains movement of the second spring member in the y direction.

Figure 7:
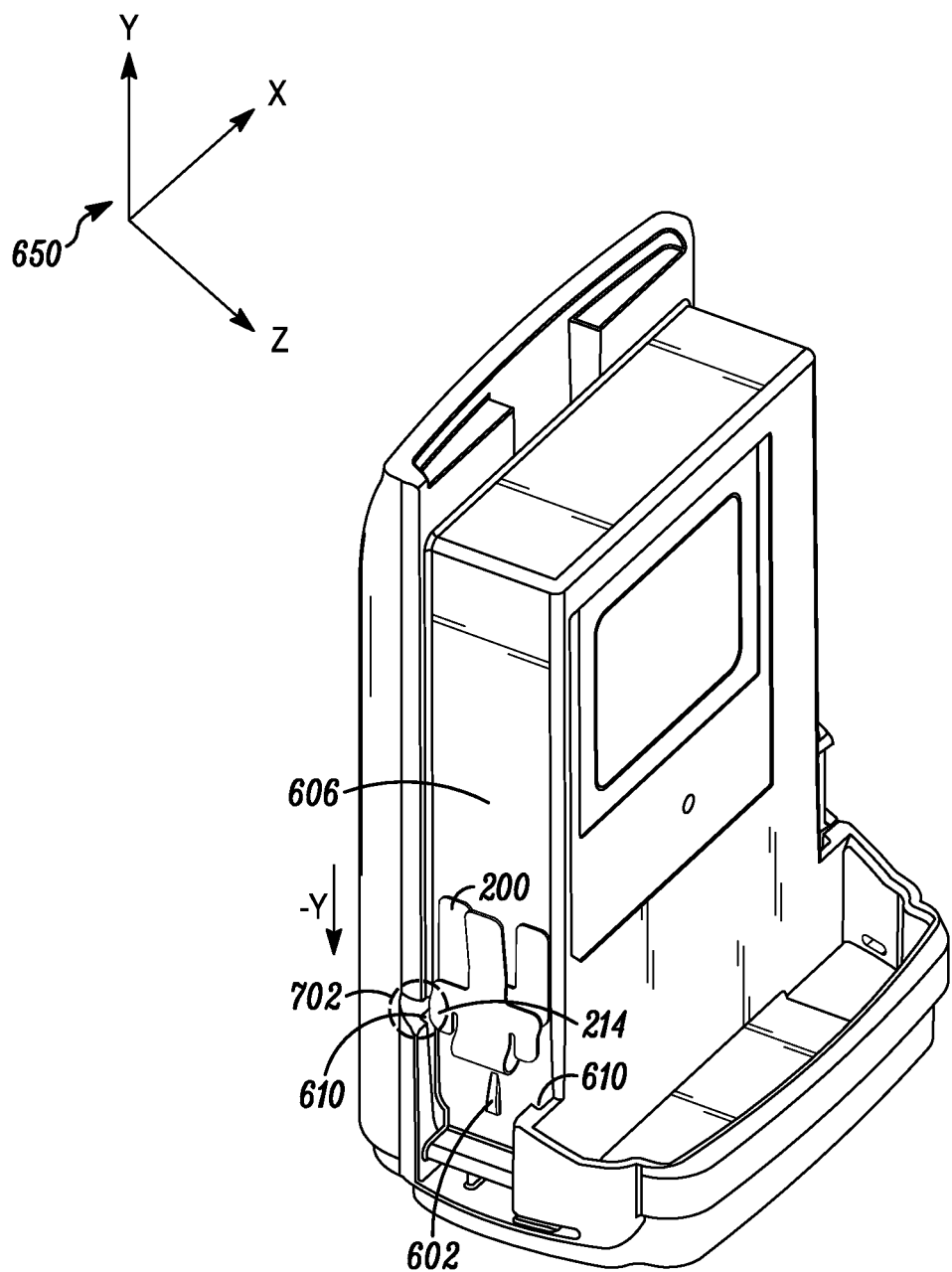
FIG. 7 illustrates the assembly process in which the spring member is positioned against the housing in accordance with an embodiment.

FIG. 7 shows spring member 200 as substantially planar portion 202 moves downward (−y) against side surface 606 such that at least one of the interference fit tabs 214 of the deflected portion 204 enters into vertical channel 610 of housing 600 as seen at 702. At least one vertical channel 610 guides and holds the spring member 200 in place prior to installation of the latch 400. This view facilitates the visualization of the spring member 200 with first, substantially planar, portion 202 and second, deflected, portion 204 connected via an elbow 206 relative to the housing 600. As seen in FIG. 7 the spring member 200 has, as yet, not come to be seated in its final position, but can be pushed further down. This interim positioning of the spring member 200 facilitates the assembly process in that there is a considerable amount of leeway as to the location of the spring member within vertical channel 610 in the vertical (y) direction. However, while the spring member 200 can be pushed further down vertical channel 610, it should not, at this point, be pushed so far down as to allow the protrusion 602 to capture slot 210. As the spring member 200 moves further into channels 610 the interference fit tabs 214 continue to constrain movement of the spring member 200 across a horizontal axis (x and/or z directions) while the latch is being installed.

Figure 8:
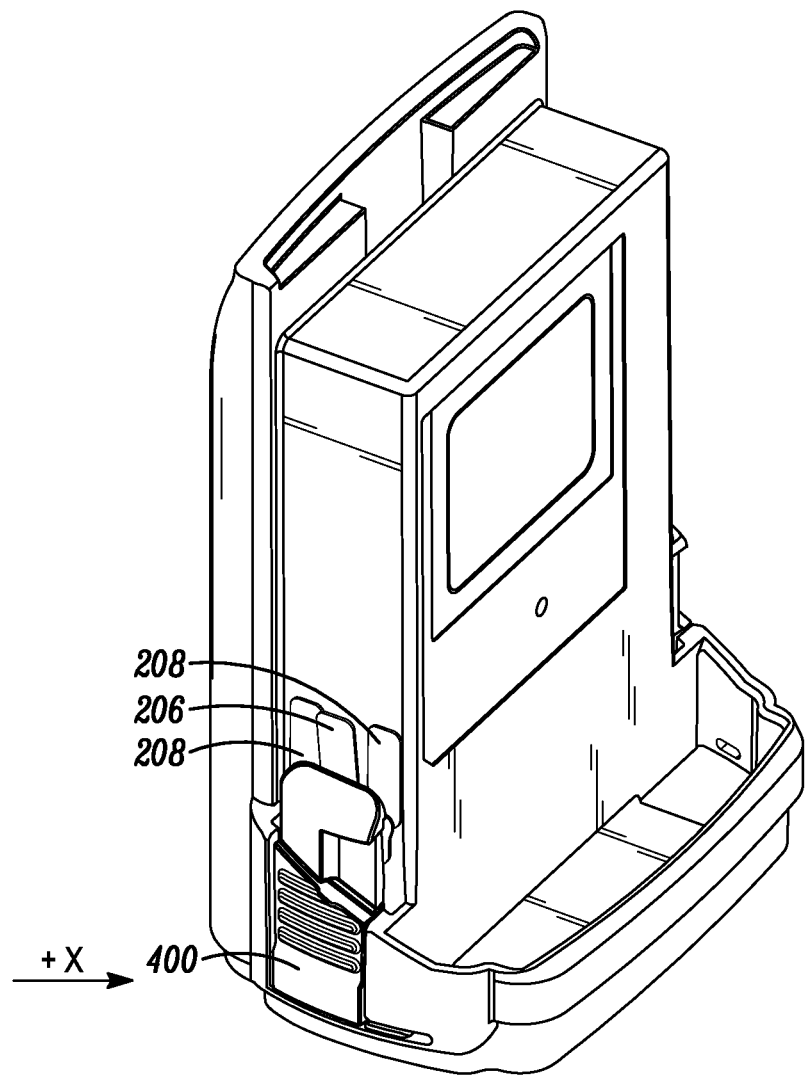
FIG. 8 illustrates the installation of the latch in accordance with an embodiment.
Figure 9:
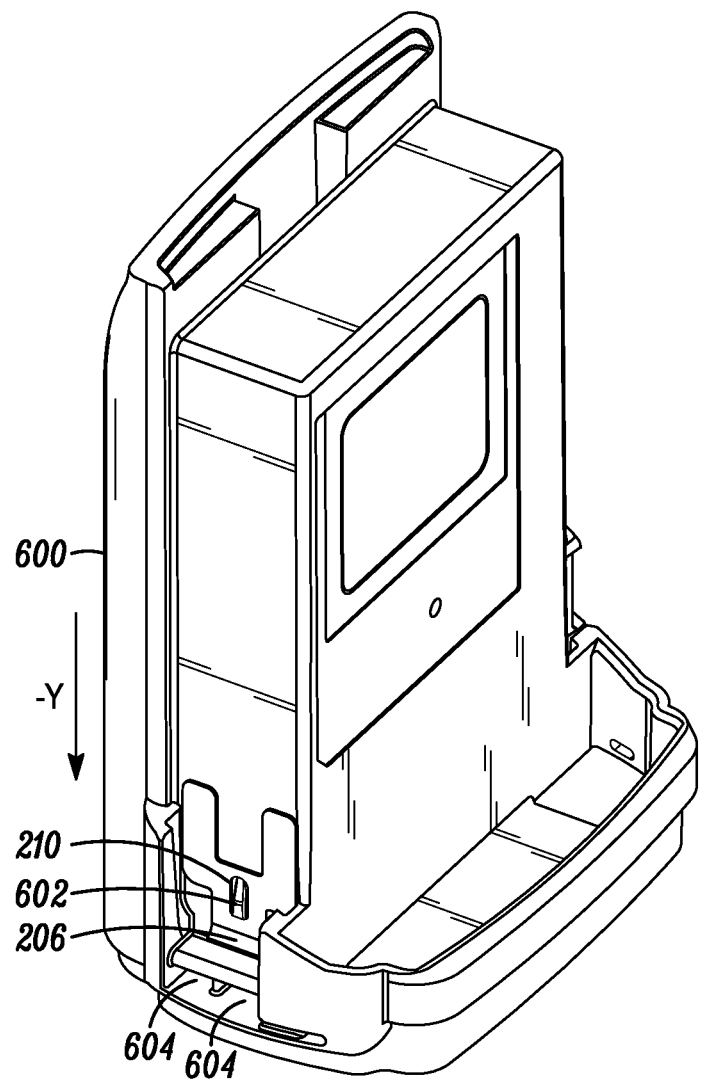
FIG. 9 illustrates a cutaway view of the spring member when locked within the housing in accordance with an embodiment.

As assembly continues, the foot members of latch 400 are inserted (+x) into the pockets 604 of the housing 600 as seen in FIG. 8. The spring member 200 can now be pushed downward (−y) into place such that the slot 210 is captured by protrusion 602 of housing 600 (as shown in cut-away view of FIG. 9) while interference fit tabs 214 are captured by latch hooks 406 (as was shown in FIG. 5). The completed latch-spring assembly 1000 in locked position is shown in FIG. 10.

In the completed latch-spring assembly 1000, protrusion 602 constrains movement of the spring member 200 in upward and downward (+/−y) directions. The elbow portion 206 of spring member 200 sits upon the first and second pockets (between hooks 406 as was shown in FIG. 5), the pockets minimizing movement of the assembly in the downward (−y) direction of an x-y-z orientation. For applications in which only one spring-latch is used or in which symmetric orientation can be used, a single foot member having a common form factor can be utilized.

For a two-latch embodiment in which left and right orientation is preferred, the left side surface 608 of housing 600 includes a second protrusion permitting alignment and engagement of a second spring member's interference fit tabs into hooks of a second latch. Again, the protrusion constrains movement of the spring member in upward and downward (+/−y) directions. For the left side surface 608 application, the second spring member's elbow portion and the hooks of the left battery latch sit upon third and forth pockets thereby minimizing movement of the assembly in the negative-y direction of an x-y-z orientation. The second protrusion constrains movement of the second spring member in the upward and downward (+/−y) direction. For designs in which orientation is desirable, the foot members are made of different form factors and the pockets are formed to accommodate those form factors. The right and left latches are mirror imaged thus providing the right and left orientation.

Figure 11:
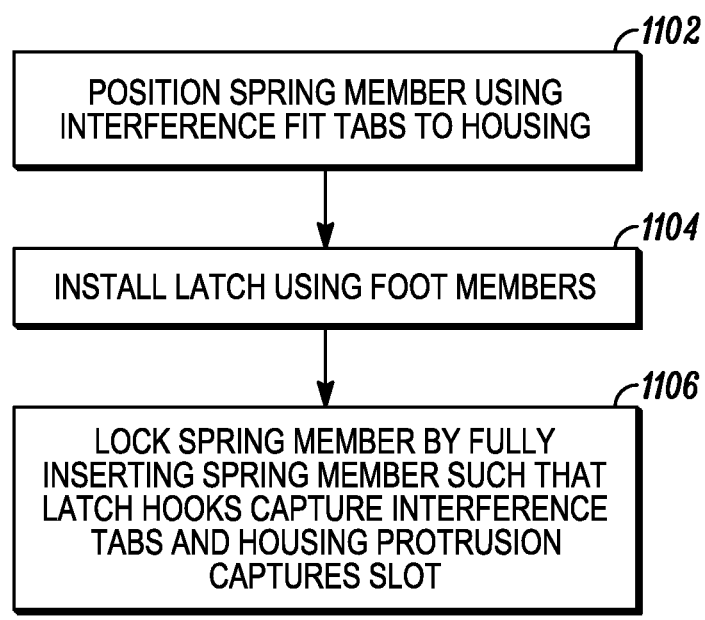
FIG. 11 is a flowchart illustrating the method for assembly for the interconnect assembly in accordance with an embodiment.

Referring to the completed assembly of FIG. 10, the latch spring-assembly 1000 is locked and can now be compressed by a user along exterior wall 404 at indentation area 442 or along upper portion of rib features 440 to pivotally engage and disengage other assemblies to the housing 600. The latch-spring assembly 1000 can be assembled in accordance with the steps of steps FIG. 11. The assembly begins at 1102 by positioning the spring member 200 such that the spring member is constrained to the housing 600 across horizontal directions (−x, +x) via interference fit tabs 214. Step 1102 is accomplished by inserting the interference fit tabs 214 within vertical channels (610). The latch is then installed by inserting foot members 408 of the latch into pockets 604 formed within the housing 600 at 1104. The result of steps 1102 and 1104 are seen in FIG. 8 which shows the constrained spring member 200 and latch 400 just prior to locking of the overall assembly. Lastly, at step 1106 locking of the spring member 200 is achieved by fully inserting the spring member such that latch hooks 406 capture the interference fit tabs 214 (as was seen in FIG. 5) while the housing protrusion 602 captures slot 210 of spring member (as was seen in FIG. 9). The completed latch-spring assembly 1000, shown in FIG. 10, is thus locked and ready to use to interconnect the housing 600 to another subassembly. For example, the latch-spring assembly 1000 can be used to engage and disengage a battery pack to another assembly, such as a portable communication device.

An interconnect assembly formed in accordance with the embodiments facilitates assembly of a reliable latch-spring with only three components. The assembly can be completed without the use of specialized tools or complex manufacturing assembly processes. A simple sliding of the spring member 200 against the housing 600 having the predetermined form factor (vertical channel, protrusion and pocket), insertion of the latch 400 into the housing, and a final push of the spring member between the latch and the housing achieves the completed locked mechanism. The interconnect assembly formed in accordance with the embodiments is particularly beneficial to a battery pack housing application where the latch-spring assembly provides a reliable interconnect that can be used to couple a communication device to the battery pack to maintain reliable contact. The latch-spring assembly can be used on other types of housings that can be molded to have the protrusion, pockets and channel features for retaining the spring member and latch.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An interconnect assembly, comprising:
   a spring member integrally formed of a first portion coupled to a second portion, the first portion being substantially planar and having a slot, the second portion formed of a cantilevered beam with interference fit tabs extending therefrom, wherein the first portion of the spring member is formed of a two-pronged member with the slot being formed at a base section of the two-pronged member;
   a latch having an interior wall having two hooks and two foot members;
   a housing having a protrusion and first and second pockets; and
   wherein the latch, spring and housing are coupled by the interference fit tabs retaining the spring member to the housing, the two foot members of the latch fitting into the first and second pockets of the housing, and the protrusion of the housing retaining the slot of the spring member, and the two hooks of the latch capturing the interference fit tabs of the spring member.

2. The interconnect assembly of claim 1, wherein across an x-y-z orientation, the first and second pockets in the housing constrains movement of the latch in y and z directions, the protrusion of the housing constrains movement of the spring member in positive and negative y directions.

3. The interconnect assembly of claim 2, wherein the housing further includes channels to guide the interference fit tabs of the spring member, the channels in the housing constraining movement of the spring member in positive and negative x directions.

4. The interconnect assembly of claim 3, wherein the interior wall of the latch further comprises a level change, the level change providing a step feature for constraining movement of the spring member in a vertical (+y) direction.

5. The interconnect assembly of claim 1, wherein the interior wall is contoured to receive the cantilevered beam of the spring member.

6. The interconnect assembly of claim 1, wherein the second portion is a deflected portion, the first portion and the second portion being coupled via an elbow and further wherein the interference tabs extend in an opposite direction to the cantilevered beam.

7. The interconnect assembly of claim 6, wherein the second deflected portion extends from the elbow into the cantilevered beam over one or more level changes formed in the second deflected portion.

8. A method of assembly for an interconnect assembly, comprising:
positioning a spring member having interference fit tabs against a housing by inserting the interference fit tabs within vertical guide channels formed in the housing, the spring member being integrally formed of a first portion and a second portion, the first portion having a two-pronged member with a slot being formed at a base section of the two-pronged member and the second portion being formed of the interference fit tabs;
installing a latch to the housing by inserting foot members of the latch into pockets formed within the housing; and
locking the spring member to the latch and to the housing by fully inserting the spring member such that latch hooks of the latch capture the interference fit tabs of the spring member while a protrusion formed on the housing captures the slot of the two-pronged member formed in the spring member.

9. The method of claim 8, wherein the latch is installed using a horizontal motion and the spring member is installed using a vertical motion to lock the latch in place against the housing.

10. The method of claim 8, wherein the interference fit tabs constrain movement of the spring member across a horizontal axis while the latch is being installed.

11. The method of claim 8, wherein the second portion is a deflected portion, the first portion and the second portion being coupled via an elbow.

12. An interconnect assembly for a battery pack, comprising:
a battery pack housing having right and left sides;
a first protrusion located on the right side of the battery pack housing and a second protrusion located on the left side of the battery pack housing;
first and second vertical channels located on the right side of the battery pack housing and third and fourth vertical channels located on the left side of the battery pack housing;
first and second spring members each having a slot for coupling to the first and second protrusion respectively and each spring member having interference fit tabs extending therefrom, wherein the first and the second spring members are each formed of a two-pronged member with the slot being formed at a base section of the two-pronged member, the interference fit tabs of the first spring member for inserting within the first and second vertical channels of the battery pack housing, and the interference fit tabs of the second spring member for inserting within the third and fourth vertical channels of the battery pack housing;
first and second pockets formed within the right side of the battery pack housing and third and fourth pockets formed on the left side of the battery pack housing;
a right battery latch having hooks and foot members, the foot members being inserted within the first and second pockets on the right side of the battery pack housing, the hooks capturing the interference fit tabs of the first spring member; and
a second battery latch having foot members and hooks, the foot members of the second battery latch being inserted within the third and fourth pockets on the left side of the battery pack housing, the hooks of the second battery latch capturing the interference fit tabs of the second spring member.

13. A battery pack interconnect assembly of claim 12, wherein the foot members of the right battery latch have a mirror image footprint of the foot members of the left battery latch.

14. A battery pack interconnect assembly of claim 13, wherein the first and second pockets on the right side of the battery pack housing are different sizes and the third and fourth pockets on the left side of the battery pack housing are the mirror image of those on the right side of the battery pack housing.

15. A battery pack interconnect assembly of claim 14, wherein the right and left battery latches compress via the first and second spring members to engage and disengage the battery pack from another sub-assembly.

16. A battery pack interconnect assembly of claim 12, wherein the first and second spring members each comprise:
a forked portion;
an elbow portion coupled to the forked portion; and
a deflected portion having a cantilevered beam, the interference fit tabs located on either side of the cantilevered beam.

17. A battery pack interconnect assembly of claim 16, wherein the elbow portion of the first spring member and the hooks of the right battery latch sit upon the first and second pockets, and the elbow portion of the second spring member and the hooks of the left battery latch sit upon the third and forth pockets and thereby minimizing movement of the assembly in the negative-y direction of an x-y-z orientation.

18. The battery pack interconnect assembly of claim 17, wherein, across an x-y-z orientation, the first and second pockets constrain movement of the right battery latch in y and z directions and a positive x direction, and the first protrusion constrains movement of the first spring member in the y direction, and the third and fourth pockets constrain movement of the left battery latch in y and z directions and a negative x direction, and the second protrusion constrains movement of the second spring member in the y direction, and the first and second vertical channels constrain movement of the first spring member in the x and z directions, and the third and fourth vertical channels constrain movement of the second spring member in the x and z directions.

19. The battery pack interconnect assembly of claim 16, wherein the interference tabs of each of the first and second spring members extend in an opposite direction to the cantilevered beam.

20. The battery pack interconnect assembly of claim 16, wherein the deflected portion of each of the first and second spring members extends from the elbow into the cantilevered beam over one or more level changes formed in the deflected portion of each of the springs.

21. An apparatus, comprising:
   an integrally formed spring member having a planar portion and a deflected portion, the planar portion having a slot and the deflected portion having interference fit tabs, wherein the planar portion of the spring member is formed of a two-pronged member with the slot being formed at a base section of the two-pronged member;
   a housing having a protrusion, a vertical channel and a pocket formed along a surface of the housing; and
   an molded latch having a foot member for inserting into the pocket of the housing and having hooks for receiving the interference fit tabs of the deflected portion of the spring member as the protrusion of the housing captures the slot of the substantially planar portion.

22. The apparatus of claim 21, wherein the planar portion and the deflected portion are coupled via an elbow and further wherein the interference tabs extend in an opposite direction to the cantilevered beam.

* * * * *